United States Patent [19]
Schenk

[11] Patent Number: 5,962,928
[45] Date of Patent: Oct. 5, 1999

[54] ELECTRONIC CIRCUIT FOR SUPPLYING A VOLTAGE

[75] Inventor: Joachim Schenk, Hemmingen, Germany

[73] Assignee: Robert Bosch GmbH, Stuttgart, Germany

[21] Appl. No.: 08/987,988

[22] Filed: Dec. 10, 1997

[30] Foreign Application Priority Data

Dec. 12, 1996 [DE] Germany .......................... 196 51 612

[51] Int. Cl.$^6$ ....................................................... H02J 3/04
[52] U.S. Cl. .............................. 307/10.7; 307/66; 307/85; 307/86; 320/125; 123/630
[58] Field of Search .................................. 307/9.1, 10.1, 307/10.7, 64, 66, 85, 86, 67; 320/127, 125; 135/134; 123/630

[56] References Cited

U.S. PATENT DOCUMENTS

| | | | |
|---|---|---|---|
| 4,036,199 | 7/1977 | Chateau ................................. | 123/630 |
| 4,297,629 | 10/1981 | Godard et al. ............................ | 307/66 |
| 5,204,610 | 4/1993 | Pierson et al. ............................ | 307/66 |
| 5,316,868 | 5/1994 | Dougherty et al. ........................ | 429/9 |
| 5,416,401 | 5/1995 | Neuhaus .................................. | 320/125 |

FOREIGN PATENT DOCUMENTS 41 38 943 C1   5/1993   Germany .

*Primary Examiner*—Albert W. Paladini
*Attorney, Agent, or Firm*—Michael J. Striker

[57] ABSTRACT

The electronic circuit for supplying a voltage at a common output terminal (Kl.U) has a number of supply circuits, each of which includes a source (B1, B2, . . . , Bn) of electric current and transistors (T10,T11; T20,T21; . . . ; Tn0,Tn1) connected with the source (B1, B2) to form an analog switch for gating the electric current, each supply circuit being connected with the common output terminal (Kl.U); and a circuit device for controlling a potential at the gate electrodes of the transistors (T10,T11; T20,T21; . . . ; Tn0,Tn1) in each supply circuit, whereby the supply voltage (UV) is provided by a selected one of the supply circuits. In a preferred embodiment the circuit device for controlling the gate electrode potentials includes a switch (Z) connected between a current supply and the gate electrodes of the transistors in each of the supply circuits by means of at least one resistor and a Zener diode arranged in a blocking direction with another transistor (T12) connected between the Zener diode and the at least one resistor.

12 Claims, 2 Drawing Sheets

ELECTRONIC CIRCUIT FOR SUPPLYING A VOLTAGE

BACKGROUND OF THE INVENTION

The present invention relates to an electronic circuit for supplying a voltage for an electronic component comprising at least two supply means for supplying voltage and/or current including, e.g. batteries, which are connectable with each other by electronic circuit means and a switch which is connected with at least one of the supply means.

The safe and reliable supply of voltage must be guaranteed for various electronic and/or electrical components. The voltage supply can be provided with the help of distinct and different voltage sources, for example with the help of two batteries. Measures must be taken to interrupt, if necessary, the connection between the voltage sources, so that an undesirable energy exchange between the voltage sources and/or batteries does not occur.

Thus, for example, in a device for supplying a voltage in a motor vehicle described in German Patent DE-PS 41 38 943 an electronic circuit is used which is connected between two supply batteries and includes a charging/disconnecting module. Both batteries are charged by a generator with this charging/disconnecting module and under certain conditions supply a consumer network. The connection between both batteries is then always broken with the help of this charging/disconnecting module, when the charge states of the batteries differs greatly or when the battery associated with the starter during the starting process must overcome a voltage drop.

SUMMARY OF THE INVENTION

It is an object of the present invention to provide an improved electronic circuit for supplying a voltage of the above-described type, especially for use in a motor vehicle.

The electronic circuit according to the invention has the advantage that a safe and reliable supply of voltage for an electronic component is guaranteed when it is used to supply the voltage. At least two voltage or current supply sources are provided, which are connectable respectively with the help of an electronic circuit means with a common output terminal at which the voltage required for supply of an electronic consumer circuit is provided. Thus according to choice the voltage can be supplied from one of the at least two supply means, for example from two separate batteries. When a voltage, which can be set by means of a Zener diode, drops below a predetermined threshold value, automatic switching from one supply means to another occurs. At the same time a compensating current flow between the voltage and/or supply means such as batteries and/or between the supply circuits is prevented. A general shut down of each supplier is also possible under special circumstances.

The circuit according to the invention is integrated in an advantageous manner into a fixed voltage regulator. When an analog switch or switches are provided with overload means, none of the electrical supply means is overloaded. Only a reduced voltage drop occurs because of the use of field effect transistors for decoupling of the electrical supply means. It is advantageously less than in a decoupling circuit which uses diodes.

BRIEF DESCRIPTION OF THE DRAWING

The objects, features and advantages of the invention are now illustrated in greater detail by the following description of the preferred embodiments with reference to the accompanying drawing in which.

DESCRIPTION OF THE PREFERRED EMBODIMENTS

Figure 1:
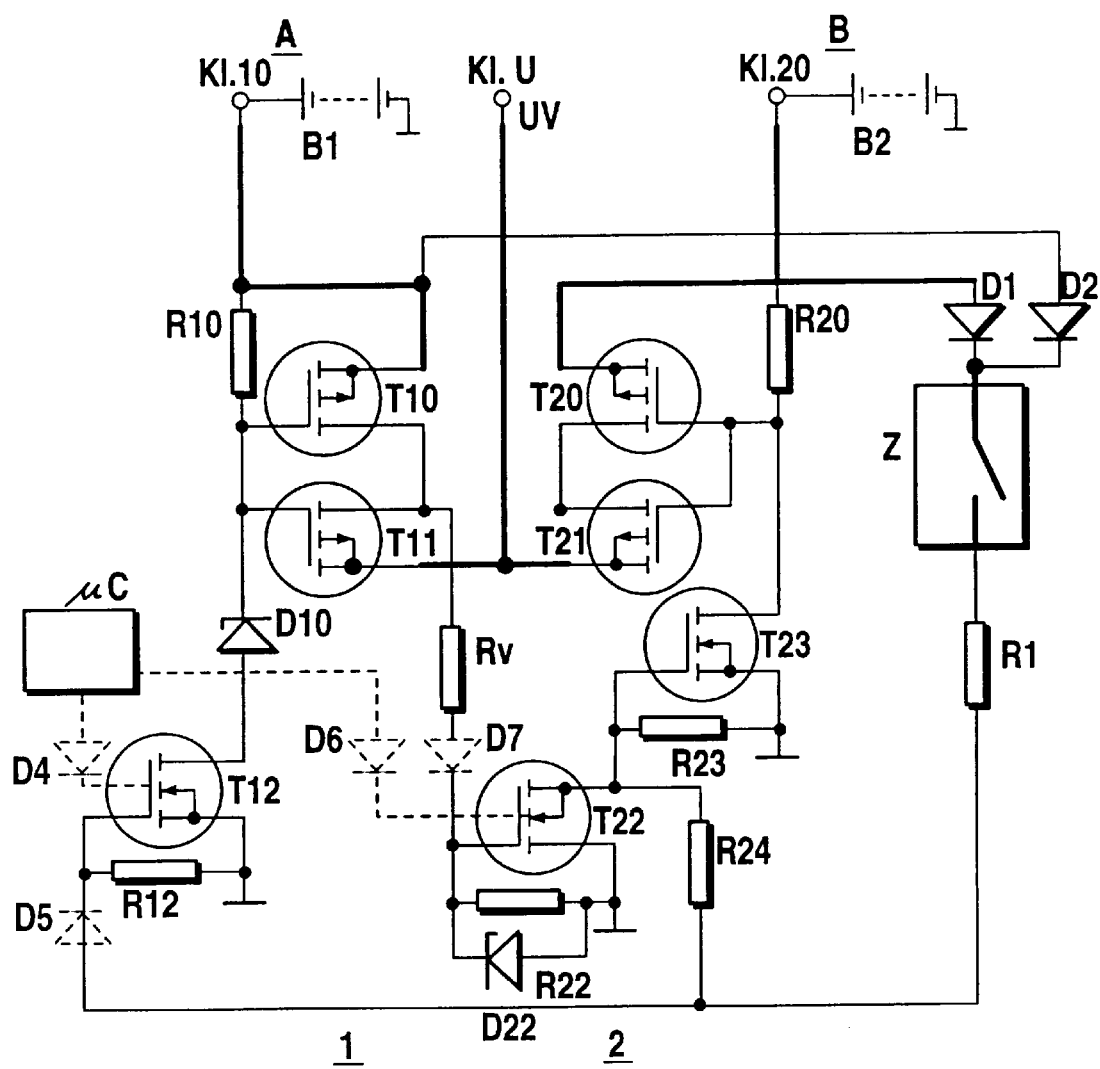
FIG. 1 is a schematic diagram of a first embodiment of the electronic circuit for supplying a voltage according to the invention.
Figure 2:
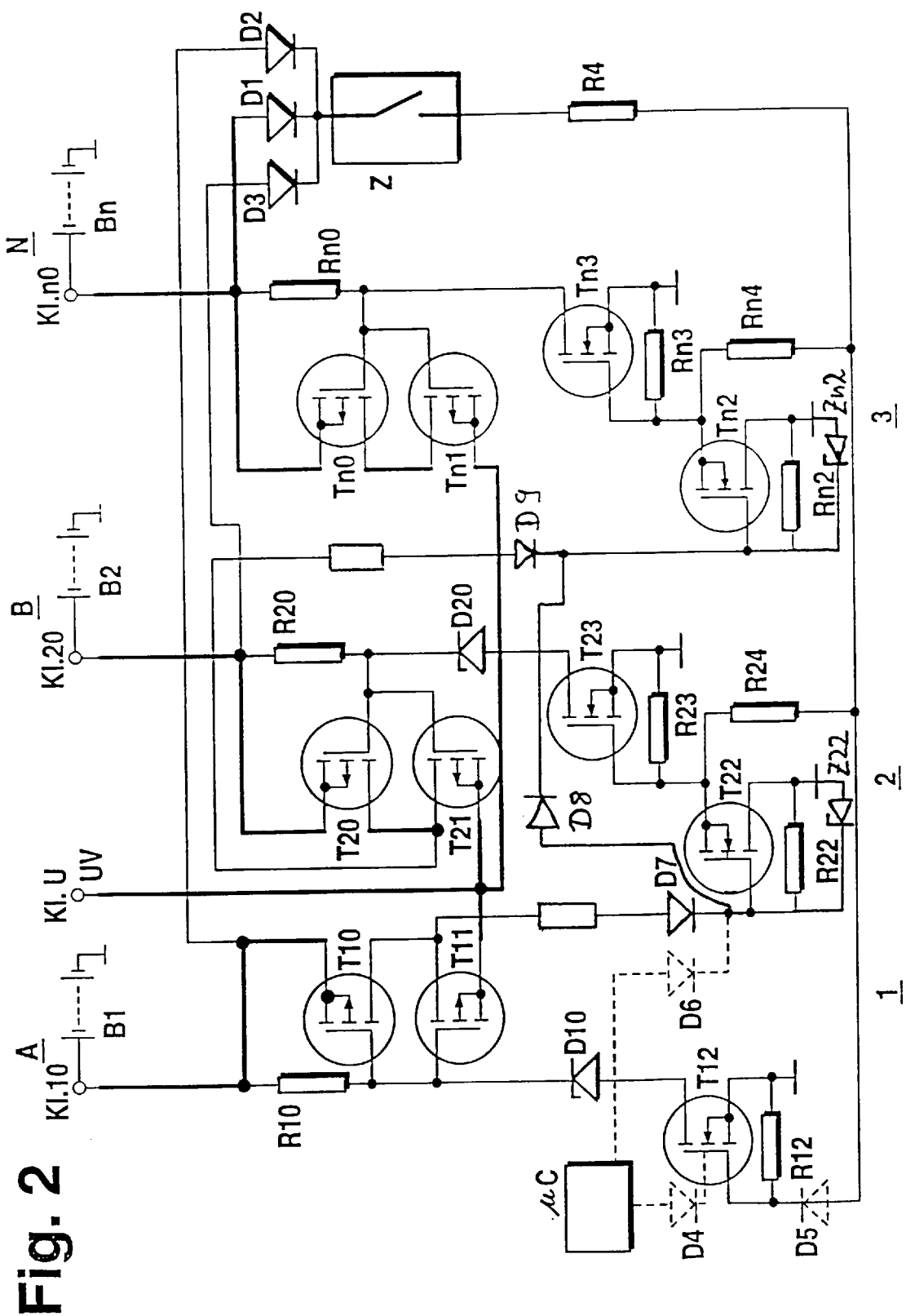
FIG. 2 is a schematic diagram of a first embodiment of the electronic circuit for supplying a voltage according to the invention.

Both embodiments shown in FIGS. 1 and 2 generally supply an electronic component, which is connected to the output terminal KI.U at which the voltage UV is provided. The voltage UV is supplied either by one supply means or supply circuit connected to the input terminal KI.10 or by another supply means or supply circuit connected to the input terminal KI.20. These supply means or supply circuits can also each be called a voltage source and include, for example, a battery.

If the electronic circuit for supplying a voltage according to the invention is used in a motor vehicle power supply network, the input terminal KI.10 is connected with a first battery B1 and the input terminal KI.20, with a second battery B2, which are charged by an unshown generator and supply the starter and/or the remaining power supply. For example, a control unit can be connected to the voltage supplying connector or output terminal KI.U, and is then reliably supplied with a voltage. In a vehicle provided with a power supply controller this controller is connected to the output terminal KI.U, both batteries are then similarly connected with the input terminals KI.10 and KI.20 and the power supply consumers are directly supplied from the power supply controller. The power supply controller can include an additional voltage converter, which converts the voltage UV supplied to the power supply controller into different voltages which can be adjusted to the requirements of the respective consumers to be supplied.

This circuit arrangement according to FIG. 1 includes, besides the already-mentioned terminals KI.10, KI.U with the supply circuit parts 1 and 2 and KI.20, a plurality of field effect transistors, resistors, diodes, a Zener diode and a switch, e.g. an ignition switch, which can be employed by a vehicle power supply and also can be supplied decoupled from one or more of the supply means via diodes.

Particularly in the illustrated embodiment these circuits have the following structure: the input terminal KI.10 is connected with the cathode of the Zener diode D10 by means of both field effect transistors T10 and T11 which are switched like an analog switch. A resistor R10 is connected between the gate of the field effect transistor T10 and the input terminal KI.10. The anode of the Zener diode D10 is connected with a terminal of the switch Z, e.g. for example the ignition lock, by means of the field effect transistor T12 and the resistor R1.

The end of the switch Z remote or further away from the resistor R1 is connected to the cathodes of the diodes D1, D2. The diodes D1 and D2 are supplied by the different supply means. The input terminal KI.20 is connected to the output terminal KI.U via the field effect transistors T20 and T21. The output terminal KI.U is connected with the source of the transistor T11. Both gate electrodes of the field effect transistors T20 and T21 are connected to the input terminal KI.20 via the resistor R20. Two additional field effect transistors T23 and T22 and the associated resistors R22, R23 and R24 and Z-diode D22 (at supply voltages greater than 15 V) are connected between the transistors T20, T21 and the transistors T10, T11. Additional diodes D4, D5, D6 and D7 and a resistor Rv can also be present in various embodiments.

An embodiment of the invention is shown in FIG. 2, with whose help a compound supply, for example with the current circuits A, B, . . . , N, which can include the batteries B1, B2 . . . , Bn, can be provided. This embodiment differs from the previous embodiment according to FIG. 1 only in that at least one additional circuit part 3 is present, which corresponds to the circuit part 2 in FIG. 1 and is connected by an additional diode with the switch Z. The Zener diodes Z22 and Zn2 are in parallel to the resistors R22 and Rn2 respectively.

When a compound supply with n>3 is provided, an additional equal circuit part must be employed. It is essential that a Zener diode D20 be present between both gate electrodes of the transistors T20 and T21 and the drain electrode of the transistors T23, which is connected in the blocking direction, in each circuit part except the last (n).

The operation of the embodiments shown in FIGS. 1 and 2 is described in the following:

1. Supply of the Terminal KI.U via the Terminal KI.10

When the output terminal KI.U is to be supplied with voltage from the input terminal KI.10, the switch Z, for example the ignition switch, is supplied by a current supply circuit. When the switch Z is closed, the transistor 12 conducts and the anode of diode D10 is thus connected to ground. When the voltage at the input terminal KI.10 is larger than the Zener voltage of the diode 10, a voltage drop occurs at the resistor R10, which causes the field effect transistors T10 and T11 to become conducting. Since both these transistors are connected as an analog switch, the voltage of the input terminal KI.10 is made available at low impedance at the output terminal KI.U for supplying voltage. The source voltage of the transistors T10 and T11 is applied then through the transistor T22, whose gate voltage is limited with a Z-diode D22 and the barrier resistor Rv at voltages greater than 15 V, which block the transistor T23 and thus also the transistors T20 and T21.

If the switch Z should be related to ground, an addition to the circuit part A is necessary: a P-channel preliminary stage must be provided for the transistor T12.

2. Supply of the Terminal KI.U via the Terminal KI.20

The switch Z is again provided with a current supply circuit. In the event that it should be related to ground, similarly a P-channel preliminary stage should be provided for the transistor T12. If the switch Z is closed, the transistor T12 is made conducting so that the anode of the diode D10 is grounded. When the voltage at the input terminal KI.10 is less than the Zener voltage of the diode D10, no voltage drop occurs at the resistor R10, so that the transistors T10 and T11 are blocking. The source voltage of the transistor T10 and transistor T11 is determined by the resistor R22, so that the transistor T22 is blocking. Thus the transistor T23 is made conducting via the resistors R24 and R23. This has the consequence that the transistors T20 and T21 are conducting. The voltage, which appears at the input terminal KI.20 is thus provided at low impedance to the output terminal KI.U, whereby a supply voltage UV is made available at the input terminal KI.U, which is processed for consumer devices and can be used for supplying voltage to a power supply, for example to the power supply controller.

3. Supply of the Terminal KI.U via the Terminal KI.n0

The switch Z is also supplied by a current circuit in this case. If the switch Z should be grounded, a P-channel pre-stage is similarly required for the transistor T12.

If the switch Z is closed, the transistor T12 conducts so that the anode of the diode D10 is grounded. If the voltage of the input terminal KI.10 is less than the Zener voltage of the diode D10, no voltage drop occurs at resistor R10, so that the transistors T10 and T11 are blocking. The source-voltage of the transistors T10 and T11 is determined then by the resistor R22, so that the transistor T22 blocks. Because of that also the transistor T23 is made conducting via the resistor R23 and R23, whereby also the transistors T20 and T21 are conducting. The voltage of the input terminal KI.20 is provided thus at low impedance to the output terminal KI.U and is made available there as supply voltage UV. The supply voltage UV is produced by current circuit B with the battery B2.

Under the above-mentioned assumption that the voltage at the input terminal KI.20 is less than the Zener voltage of the diode D20, no voltage drop occurs also at the resistor R20, so that the transistors T20 and T21 block. The source voltage of the transistors T20 and T21 is determined by the resistor Rn2, so that the transistor Tn2 blocks. Thus the transistor Tn3 is made conducting by means of the resistor Rn4 and Rn3 and thus the transistors Tn0 and Tn1 are also conducting. The voltage which appears at the input terminal KI.10 is thus supplied at low impedance to the output terminal KI.U and made available there as the supply voltage UV.

The diodes D8 and D9 decouple the control voltage for the transistor Tn2. In the event that the transistors T10 and T11 or T20 and T21 are conducting, the transistor Tn2 is then also conducting.

The modular structure of the voltage supply circuit according to the invention is arbitrarily expandable or open-ended. The Zener diodes can also have different breakdown voltages so that the voltage supply can be switched to different voltages. Control of the transistors Tx2(T12, T22, Tn2) by other signal transmitters, for example a microprocessor $\mu C$, is similarly possible in one embodiment or expansion of the circuit described above and also shown in the drawing. This microprocessor $\mu C$ would be connected with the gate electrodes of the individual transistors Tx2 decoupled then by means of the diodes and the required potential influences would be provided for activation of the circuit processes. The Zener diodes can be omitted in a circuit controlled by a microprocessor $\mu C$, in the event that it would measure the voltages or when other circuit parameters are used.

The circuit arrangement according to the invention at large supply current can be built so as to be discrete or separate. At small supply current an integration as a single or multiple chip is also possible. For example, this type of circuit can be built into a fixed voltage regulator, also when integrated in a chip which is present.

If the transistors TX1 (T11, T21, Tn1) are eliminated, a simple embodiment without preventing compensating current may be built in.

When an analog switch with overload protection is used, as described for example in German Patent Application DE P 1 95 48 612, a voltage supply circuit may be built which has a reliable overload protection.

The disclosure in German Patent Application 196 51 612.9 of Dec. 12, 1996 is incorporated here by reference. This German Patent Application, at least in part, describes the invention described hereinabove and claimed in the claims appended hereininbelow and provides the basis for a claim of priority for the instant invention under 35 U.S.C. 119.

While the invention has been illustrated and described as embodied in an electronic circuit for supply a voltage, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

I claim:

1. An electronic circuit for supplying a voltage, said electronic circuit including a plurality of supply circuits (1,2), each of said supply circuits including a source (B1,B2) of electric current and a pair of transistors (T10,T11; T20,T21) connected with said source (B1,B2) of said electric current to form an analog switch for gating said electric current, each of said transistors having a gate electrode;

means for electrically connecting said pair of said transistors in each of said supply circuits with a common output terminal (KI.U) at which a supply voltage (UV) is provided for at least one consumer connected with said output terminal; and a switch (Z) connected electrically between a current supply and the gate electrodes of said pair of said transistors in one of said supply circuits by means of at least one resistor (R1), a Zener diode (D10) connected to said gate electrodes so as to be polarized in a blocking direction with respect to said gate electrodes and an additional transistor (T12) connected between said Zener diode (D10 and said at least one resistor (R1), so that said additional transistor (T12) conducts and said Zener diode (D10) is grounded when said switch (Z) is closed;

whereby said supply voltage (UV) is provided at said output terminal (KI.U) by said one or another of said supply circuits (1,2) according to whether said switch (Z) is closed or open respectively.

2. The electronic circuit as defined in claim 1, wherein said transistors are field effect transistors.

3. The electronic circuit as defined in 1, further comprising a voltage regulator connected with said output terminal (KI.U) for supplying a fixed regulated voltage to said at least one consumer.

4. The electronic circuit as defined in claim 1, further comprising at least one other Zener diode and wherein each of said Zener diodes has a different breakdown voltage.

5. The electronic circuit as defined in claim 1, further comprising a P-channel preliminary circuit stage for said another transistor (T12), and wherein said switch (Z) is electronically connected to ground via an additional resistor (R12).

6. The electronic circuit as defined in claim 1, consisting of an integrated circuit.

7. The electronic circuit as defined in claim 6, wherein said integrated circuit includes a voltage regulator connected to said output terminal (KI.U) to supply a predetermined fixed voltage for said at least one consumer.

8. The electronic circuit as defined in claim 1, wherein each of said analog switches is provided with means for protection against overload.

9. The electronic circuit as defined in claim 1, consisting of a motor vehicle supply circuit, and wherein said source of electric current comprises a battery and said supply circuits include respective input terminals (KI.10, KI.20) connected with respective ones of said batteries.

10. The electronic circuit as defined in claim 9, further comprising a controller connected to said output terminal (KI.U) at which said supply voltage is provided, and wherein said controller is a power supply control unit including means for at least partially controlling voltage, means for converting said supply voltage into a plurality of different voltages for respective consuming devices in said motor vehicle and means for controlling said gate electrodes of said analog switches according to predetermined conditions.

11. An electronic circuit for supplying a voltage, said electronic circuit including a plurality of supply circuits, each of said supply circuits including a source (B1, B2, . . . , Bn) of electric current and transistors (T10,T11; T20,T21; . . . ; Tn0,Tn1) connected with said source (B1, B2) of said electric current to form an analog switch for gating said electric current, each of said transistors having a gate electrode;

means for electrically connecting said transistors in each of said supply circuits with a common output terminal (KI.U) at which a supply voltage (UV) is provided for at least one consumer connected with said output terminal;

a switch (Z) connected electrically between a current supply and the gate electrodes in each of said supply circuits by means of at least one resistor and at least one other transistor; and a microprocessor ($\mu$C) connected with said gate electrodes of said transistors in each of said supply circuits, said microprocessor ($\mu$C) including means for changing a potential at each of said gate electrodes;

whereby said supply voltage (UV) is provided by one or another of said supply circuits according to said microprocessor ($\mu$C) and said switch (Z).

12. An electronic circuit for supplying a voltage, said electronic circuit including a plurality of supply circuits, each of said supply circuits including a source (B1, B2, . . . , Bn) of electric current and transistors (T10,T11; T20,T21; . . . ; Tn0,Tn1) connected with said source (B1, B2) of said electric current to form an analog switch for gating said electric current, each of said transistors having a gate electrode;

means for electrically connecting said transistors (T10, T11; T20,T21; . . . ; Tn0,Tn1) in each of said supply circuits with a common output terminal (KI.U) at which a supply voltage (UV) is provided for at least one consumer connected with said output terminal; and circuit means for controlling a potential at said gate electrode of each of said transistors (T10,T11; T20, T21; . . . ; Tn0,Tn1), whereby said supply voltage (UV) is provided by a selected one of said supply circuits.

* * * * *